US011746822B2

(12) United States Patent
Bowerman (10) Patent No.: US 11,746,822 B2
(45) Date of Patent: *Sep. 5, 2023

(54) MODULAR CLIPPING SYSTEM (71) Applicant: Bowerbags, LLC, Savannah, GA (US)

(72) Inventor: James Patrick Bowerman, Savannah, GA (US)

(73) Assignee: Bowerbags LLC, Savannah, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/695,900

(22) Filed: Mar. 16, 2022

(65) Prior Publication Data

US 2022/0205472 A1 Jun. 30, 2022

Related U.S. Application Data (63) Continuation of application No. 16/880,405, filed on May 21, 2020, now Pat. No. 11,293,479.

(60) Provisional application No. 62/904,329, filed on Sep. 23, 2019, provisional application No. 62/850,936, filed on May 21, 2019.

(51) Int. Cl.
F16B 45/06 (2006.01)
A45F 5/00 (2006.01)
F16B 45/02 (2006.01)

(52) U.S. Cl.
CPC ............... F16B 45/06 (2013.01); A45F 5/00 (2013.01); F16B 45/02 (2013.01)

(58) Field of Classification Search
CPC .. F16B 45/06; F16B 45/02; F16B 2/04; F16B 2/22; A45F 5/00
See application file for complete search history.

(56) References Cited

U.S. PATENT DOCUMENTS

| 4,697,946 A | 10/1987 | Röck et al. |
| 4,991,806 A * | 2/1991 | Nakamura ............... A47G 1/17 248/316.7 |
| 5,762,371 A | 6/1998 | Noguchi |
| 5,850,996 A | 12/1998 | Liang |

(Continued)

FOREIGN PATENT DOCUMENTS

| JP | 2018004028 A | 1/2018 |
| JP | 2018169001 A | 1/2018 |
| WO | WO 2015/063423 A1 | 5/2015 |

OTHER PUBLICATIONS

International Search Report & Written Opinion for PCT/US2022/074774, dated Feb. 17, 2023, 5 pgs.

Primary Examiner — Robert Sandy
Assistant Examiner — Louis A Mercado
(74) Attorney, Agent, or Firm — Blank Rome LLP (57) ABSTRACT A clipping apparatus is disclosed. The clipping apparatus connects on the Z-axis but can be activated for release on either the X or Y-axis. The system also has a self-locking mechanism on the handle to create a secure connection along the Z-axis. It includes a first member that includes a first cavity and a first handle and a second member that includes a second cavity and a second handle. The first member and second member are mated to a spring connection mechanism and a base plate, thereby forming an opening. When the first handle and the second handle are pushed inwards, a male fitting is accepted into the opening and locked into the opening when the first handle and the second handle are released.

9 Claims, 10 Drawing Sheets

(56) References Cited

U.S. PATENT DOCUMENTS

| | | | |
|---|---|---|---|
| 6,237,201 B1* | 5/2001 | Bonaiti | F16B 45/06 24/601.5 |
| 6,463,640 B1* | 10/2002 | Toth | A44B 11/266 24/702 |
| 8,348,317 B1 | 1/2013 | Bird | |
| 8,919,623 B1 | 12/2014 | Bergeron | |
| 9,072,364 B2* | 7/2015 | Johnson | F16M 13/027 |
| 10,070,699 B2 | 9/2018 | Bowerman | |
| 10,631,670 B1 | 4/2020 | Lo | |
| 10,912,361 B2 | 2/2021 | Wu et al. | |
| 11,125,266 B2 | 9/2021 | Garvey | |
| 11,293,479 B2* | 4/2022 | Bowerman | F16B 45/06 |
| 11,293,520 B2* | 4/2022 | Horgan | F16G 15/00 |
| 2005/0076484 A1 | 4/2005 | Sussenbach et al. | |
| 2010/0219312 A1 | 9/2010 | Johnson | |
| 2012/0134742 A1 | 5/2012 | Changsrivong et al. | |
| 2014/0301672 A1 | 10/2014 | Bowerman | |
| 2014/0325803 A1 | 11/2014 | Iannello | |
| 2015/0293146 A1 | 10/2015 | Khoshnood | |
| 2016/0095406 A1 | 4/2016 | Bowerman | |
| 2018/0163919 A1 | 6/2018 | Eckhart | |
| 2019/0074642 A1 | 3/2019 | Haunberger et al. | |
| 2019/0285110 A1* | 9/2019 | Garvey | F16B 45/06 |
| 2019/0345968 A1 | 11/2019 | Guilfoyle | |
| 2020/0224796 A1* | 7/2020 | Juzak | F16L 3/1207 |
| 2020/0370592 A1 | 11/2020 | Bowerman | |
| 2022/0205472 A1* | 6/2022 | Bowerman | F16B 45/06 |

\* cited by examiner

MODULAR CLIPPING SYSTEM

CROSS-REFERENCE TO RELATED APPLICATIONS

This application is a continuation application of U.S. patent application Ser. No. 16/880,405, filed May 21, 2020, now U.S. Pat. No. 11,293,479, which claims the benefit of U.S. Provisional Application No. 62/850,936, filed May 21, 2019, and U.S. Provisional Application No. 62/904,329, filed Sep. 23, 2019. The contents of which are incorporated herein by reference in their entirety.

FIELD OF THE INVENTION

The disclosure relates generally to a clipping apparatus and more particularly to a modular clipping system to connect to variety of webbing sizes.

BACKGROUND OF THE INVENTION

Conventional bags and other devices used to carry equipment require clipping devices in order to ensure that additional equipment that does not fit in the bag itself can still be carried while leaving the user's hands free for other activities. Typical clipping devices such as carabiners do not hold items tightly to the surface, while other clipping devices are limited to the specific types of surfaces to which they can attach.

There is therefore a need in the art for clipping systems that are both secure and modular, such that one clipping system can be used for a variety of bags and accessories with different webbing sizes.

SUMMARY OF THE INVENTION

In accordance with an aspect of the present invention, the modular clipping system made up of multiple parts to create a secure locking connection on the Z-axis, most buckles and straps connect and release on the X and Y axis. The clipping system connects on the Z-axis but can be activated for release on either the X or Y-axis. The system also has a self-locking mechanism on the handle to create a secure connection along the Z-axis.

This modular clipping mechanism is designed to connect to any size webbing included but not limited to the Molle or PALS webbing system to act as a quick release mechanism for pockets and other accessories. The system is engineered so that the clipping components and the attachment components can be separated so as to accommodate a myriad of scenarios or situations where one might need a connection on the Z-axis including but not limited to connecting a pocket or accessory.

In certain embodiments of the invention, the clipping system is comprised of a mirrored left side, a mirrored right side, a spring mated to a connect mechanism, and a base plate so that when connected it creates a complete female end clip.

In certain other embodiments, the clipping system is also comprised of a suction cup and a peg attachment that mates to the female end clip.

In yet other embodiments, the clipping system is also comprised of a magnetic and a peg attachment that mates to the female end clip.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

Figure 1A:
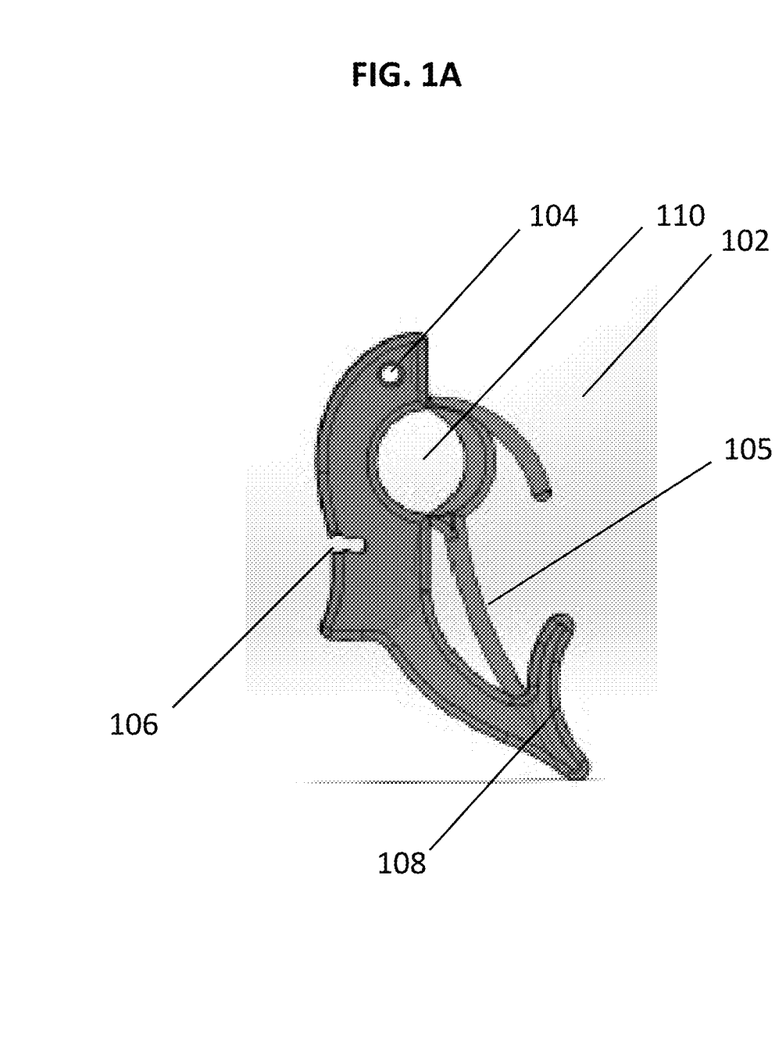
FIG. 1A is a side perspective view of a mirrored left side of the clipping system.
Figure 1B:
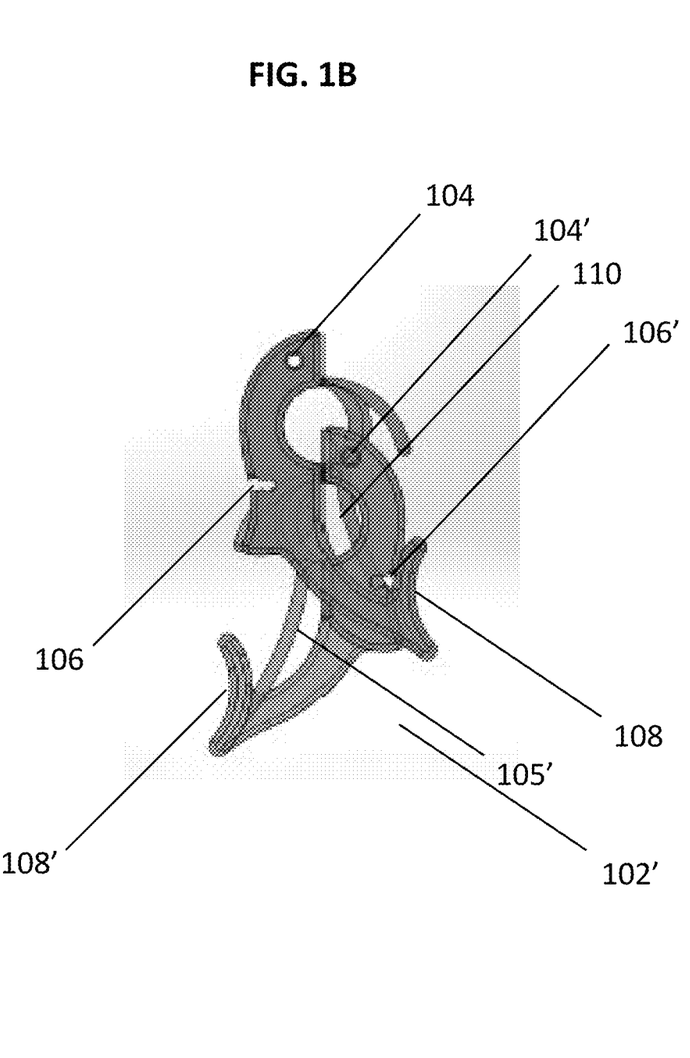
FIG. 1B is a side perspective view of the mirrored left side of the clipping system in the process of mating with the mirrored right side of the clipping system.
Figure 1C:
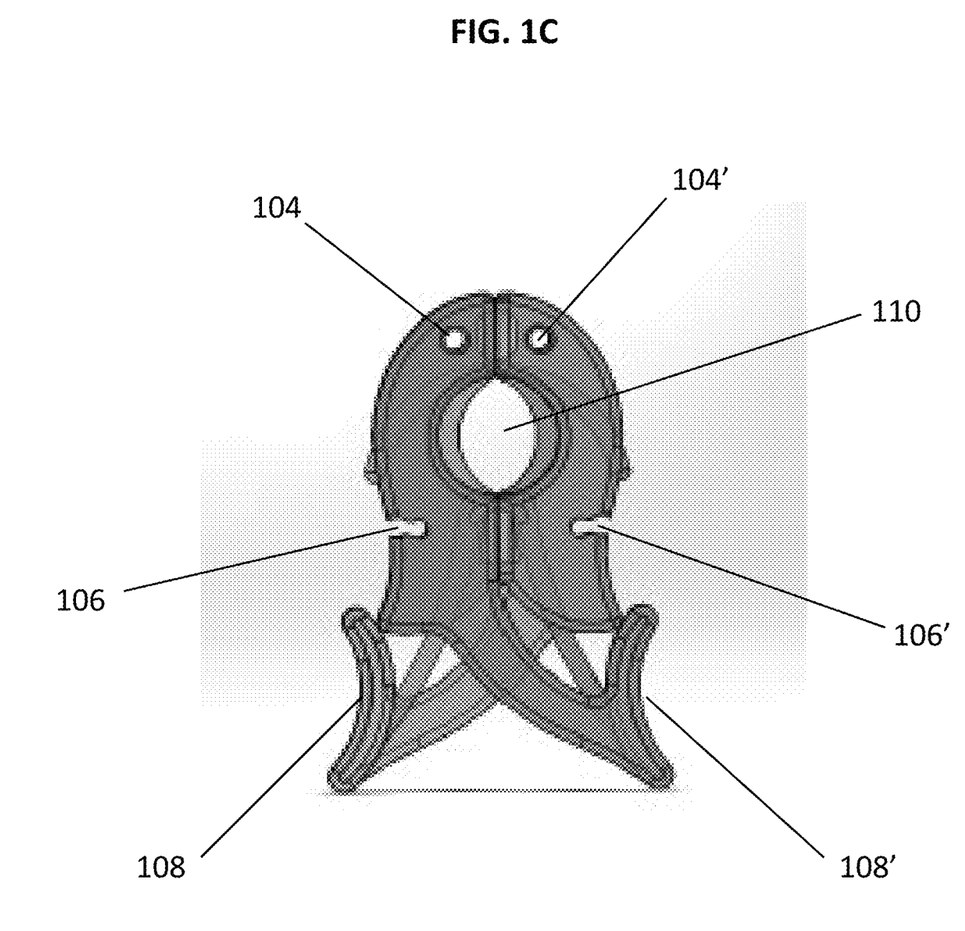
FIG. 1C is a front perspective view of the assembled clip portion of the clipping system.
Figure 5A:
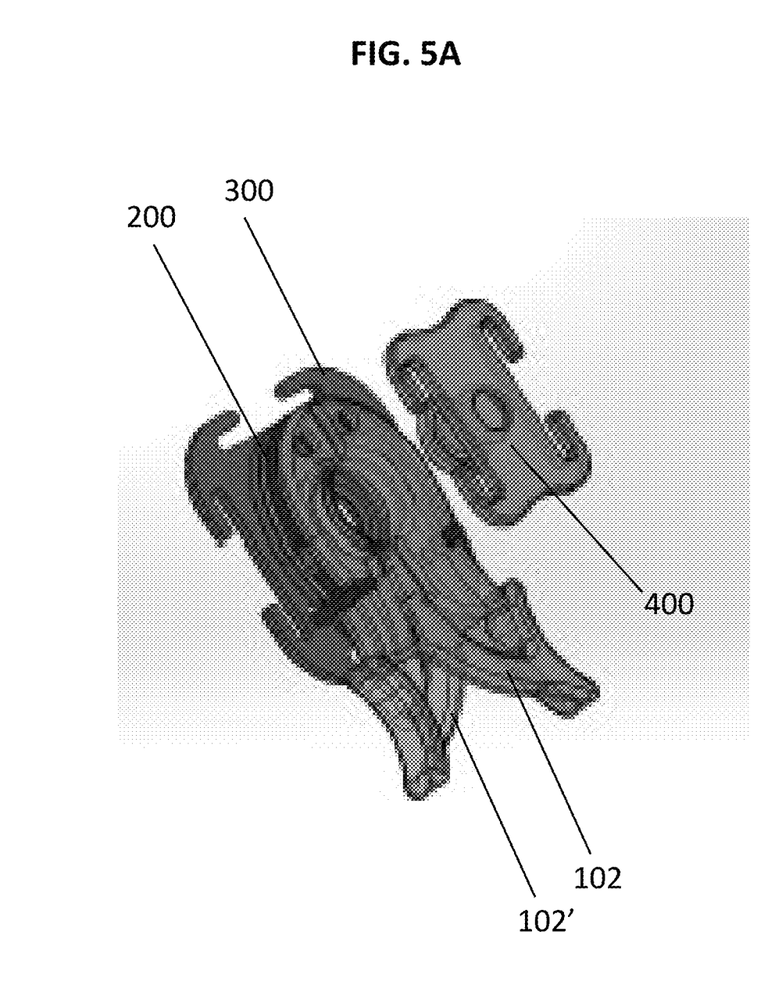
FIG. 5A is a front perspective view of the assembled base plate, the connection mechanism, and the left and right mirrored sides in the process of connecting to a male fitting or peg.
Figure 5B:
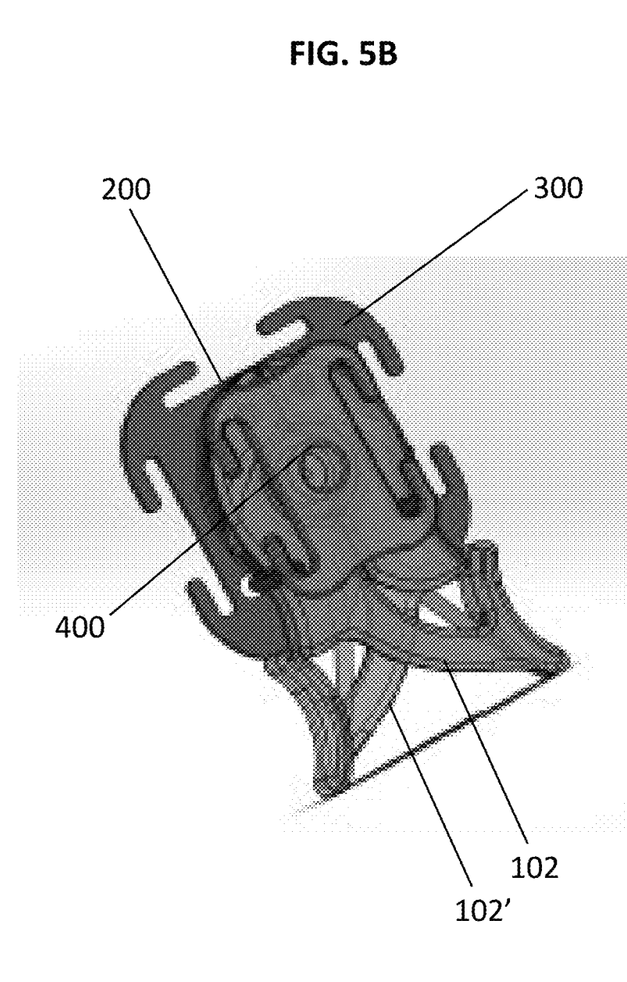
FIG. 5B is a front perspective view of the fully assembled base plate, the connection mechanism, and the left and right mirrored sides in the process of connecting to a male fitting or peg.

FIGS. 1A through 1C are perspective views of components of the clipping system. FIGS. 5A, 5B show that can be utilized, for example, to attach a first object (e.g., a bag such as a backpack) and a second object (such as a trinket). The base plate 300 is comprised of the lower openings 116, the upper connection points 118 formed as openings, four webbing guides 120, and a circular opening 122.

FIG. 1A is a side perspective view of a mirrored left side member 102 of the clipping system 100. The mirrored left side member 102 of the clipping system is a curved unitary piece that is generally elongated in shape and has a first end that is formed as a handle 108 and a second end opposite the first end. The second end has an upper clip connection point 104. The left side member 102 also has a middle section between the first and second ends. A spring mechanism cavity 106 is located at the middle section.

Figure 2A:
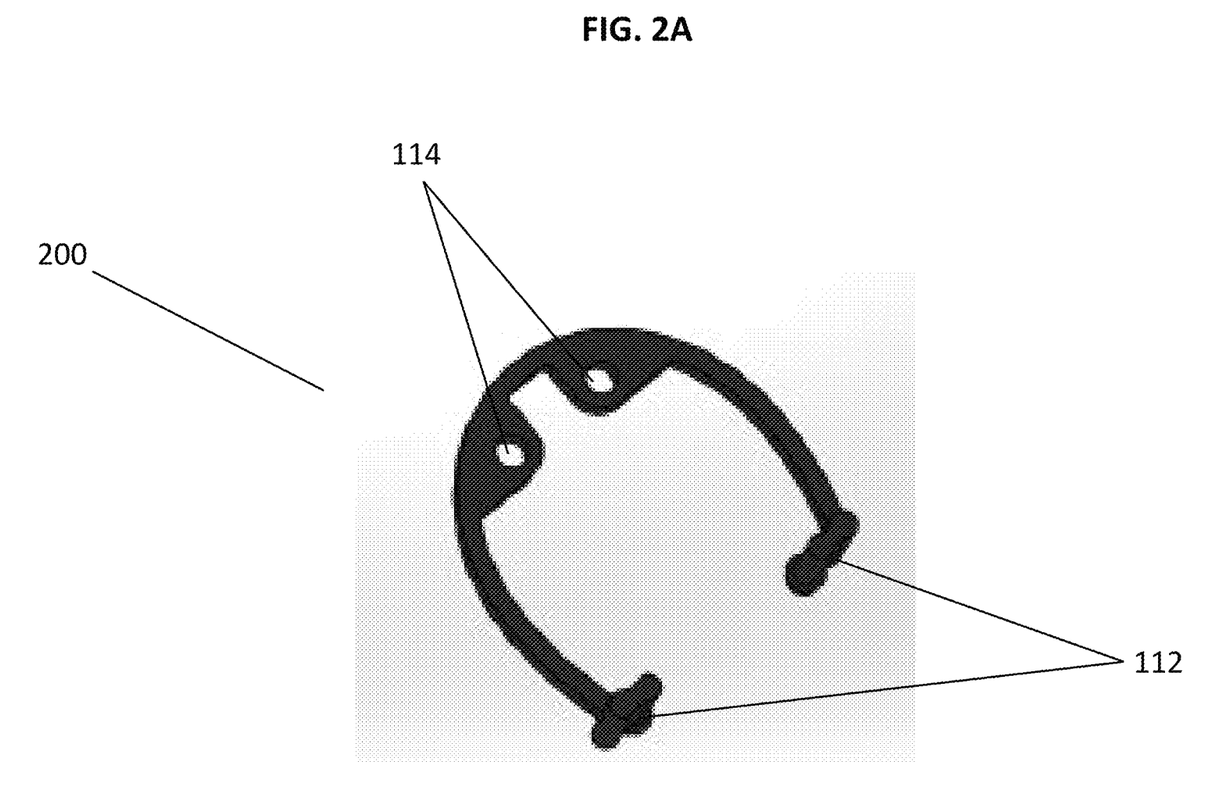
FIG. 2A is a front perspective view of a spring connection mechanism of the clipping system.

The upper clip connection point 104 is designed to mate with the upper connection point 118 of the base plate 300. The upper clip connection point 104 and the upper connection point 118 are holes that are aligned with each other and receive a screw, bolt, or other fastener. The spring mechanism cavity 106 is situated approximately halfway down the side of the mirrored left side member 102 of the clipping system 100. The spring mechanism cavity 106 is configured to receive and mate with the spring locking mechanism 112 (FIG. 2A). The handle 108 is situated near the bottom of the left side member 102. The top part of the handle 108 acts as a locking mechanism for the clip, as will be explained in greater detail herein.

FIG. 1B is a side perspective view of a mirrored left side member 102 in the process of mating with the mirrored right side member. The mirrored right side member 102' is comprised of the upper clip connection point 104', the spring mechanism cavity 106', and the handle 108'.

As with the left side member 102 (FIG. 1A), the right side member 102' (FIG. 1B) has an upper clip connection point 104' that is designed to mate with the upper connection point 118 of the base plate 300. The upper clip connection point 104' and the clip connection point 104' are holes that are aligned to receive a screw, bolt, or other fastener. The spring mechanism cavity 106' is situated approximately halfway down the side of the mirrored right side member 102 of the clipping system. The spring mechanism cavity 106' is configured to receive and mate with the spring locking mechanism 112. The handle 108' is situated near the bottom of the right side member 102'. The top part of the handle 108' acts as a locking mechanism for the base plate 300.

The left side member 102 and the right side member 102' are configured to mate together as shown in FIG. 1B. When mated, the upper connection points 104, 104', the spring mechanism cavities 106, 106', and the handles 108, 108' are laterally aligned, as shown in FIG. 1C. Further, as shown in FIG. 1C, the mated members 102, 102' form a opening 110. The opening 110 is used to connect other objects or components of the clipping system and is preferably circular. The left side member 102 and the right side member 102' each have an arm 105, 105' that connect the handles 108, 108' to the central opening 110. The arms 105, 105' act to stabilize and support the clipping system such that it is more sturdy and can hold more weight.

Figure 1D:
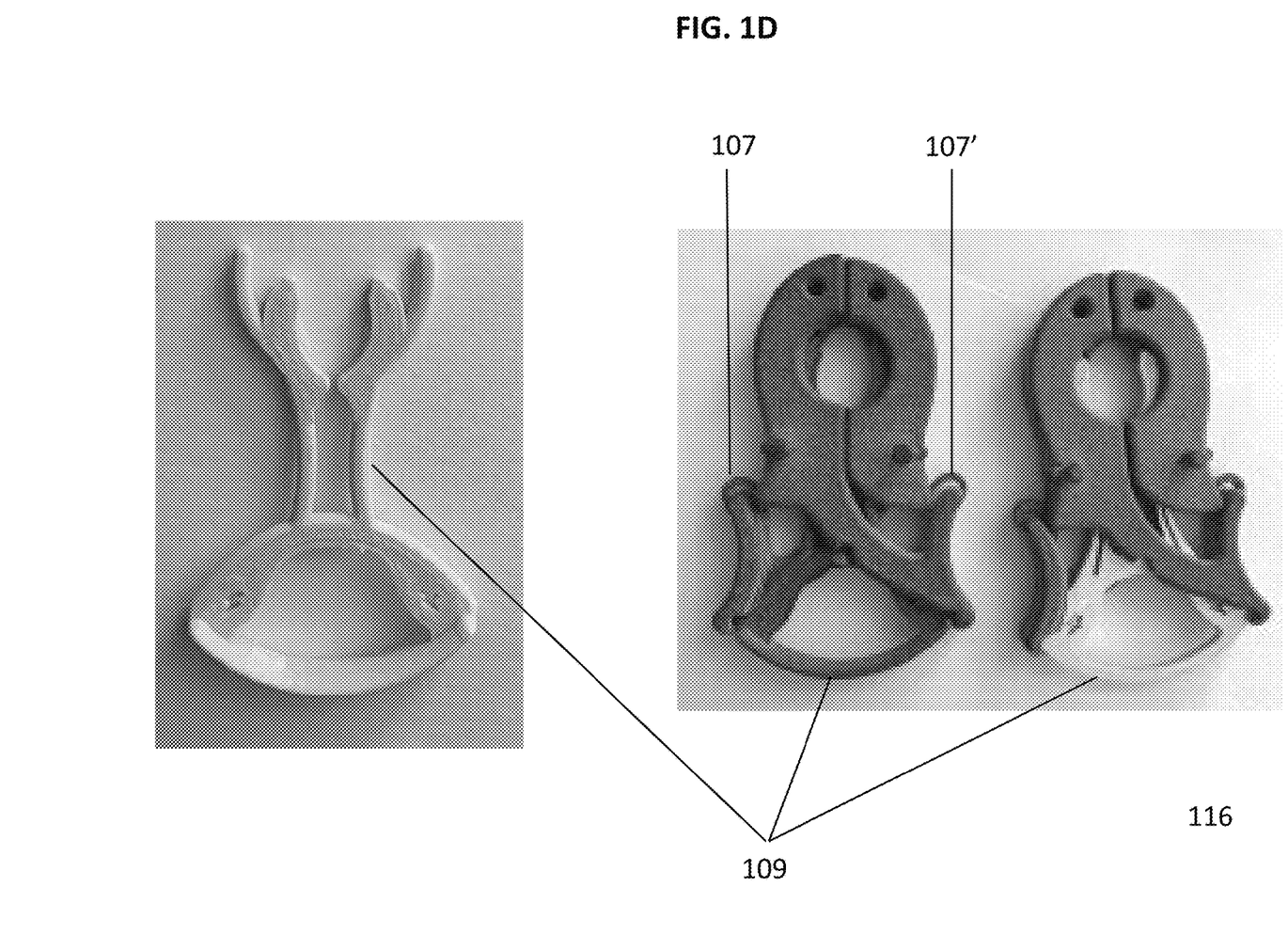
FIG. 1D is a front perspective view of an alternate embodiment of the assembled clip portion.

FIG. 1D is a front perspective view of an alternate embodiment of the assembled clip portion. In certain embodiments, the top portion of the handles 108, 108' have guardrails 107, 107' that help stabilize and guide the left and right side members 102, 102' when the handles 108, 108' are pushed inwards. In other embodiments, the clipping portion further comprises a clip locking mechanism 109. The clip locking mechanism slides under the left and right side members 102, 102' and acts to further secure the assembled clipping portion of the clipping system.

FIG. 2A is a front perspective view of the spring connection mechanism 200 of the clipping system 100. The spring connection mechanism 200 is comprised of the upper connection points 114 and the spring locking mechanisms 112. The spring connection mechanism 200 is a substantially semi-circular bar or rod that is curved so that the two distal ends come together but are separated by a gap to have somewhat of a horseshoe shape. The spring lock mechanisms 112 are small rods that extend inward at the distal ends of the bar. The upper connection points 114 are openings that are situated in a flat tab that extends inward and have openings. The upper connection points 114 are situated at the top of the connection mechanism and are designed to align with the upper connection points 104, 104' of the mirrored left and right side members 102, 102' when assembled. The spring locking mechanisms 112 are preferably elongated and substantially perpendicular to the body of the connection mechanism.

Figure 2B:
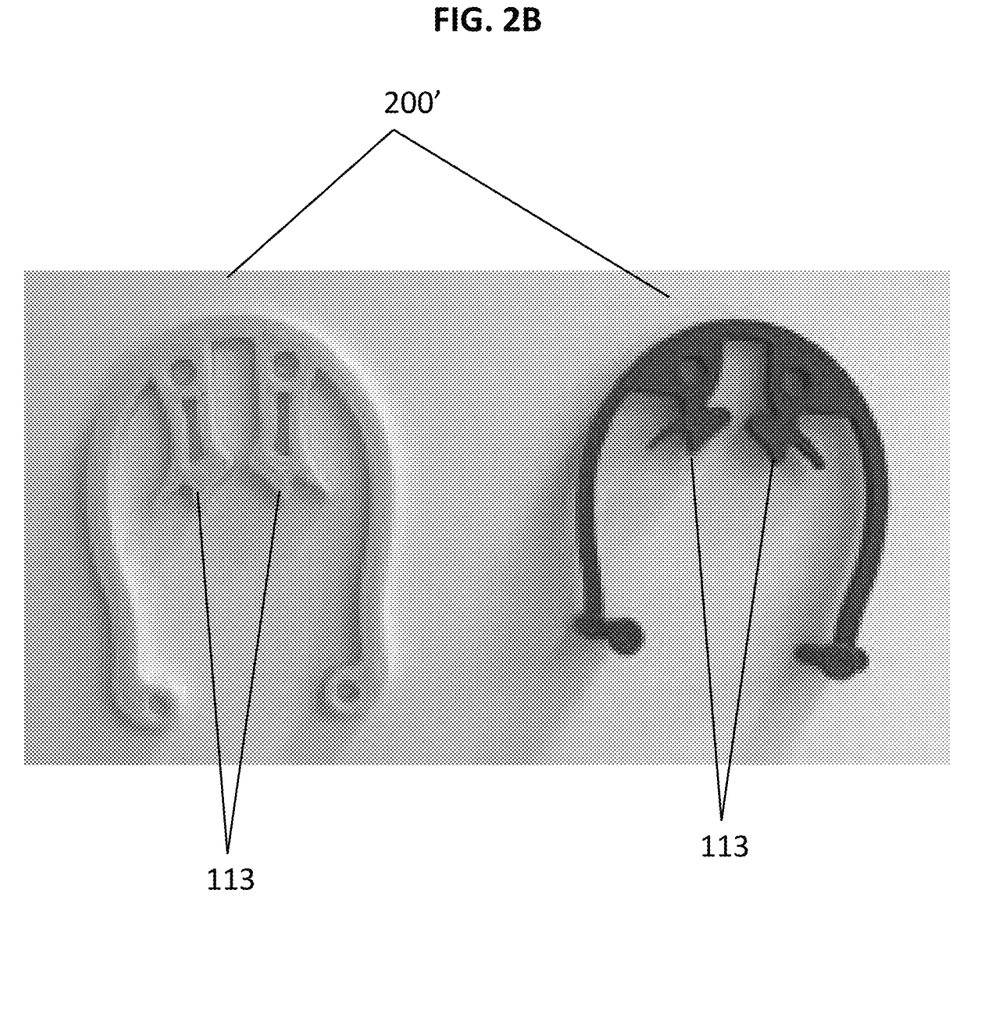
FIG. 2B is a front perspective view of an alternate embodiment of the spring connection mechanism.

FIG. 2B is a front perspective view of an alternate embodiment of the spring connection mechanism 200'. In this alternate embodiment, the spring connection mechanism 200' is further comprised of one or more connectors 113. The connectors may be used to further secure the assembled clipping system and to better grip the inserted peg 400, which is described in greater detail with respect to FIGS. 5A and 5B.

Figure 3A:
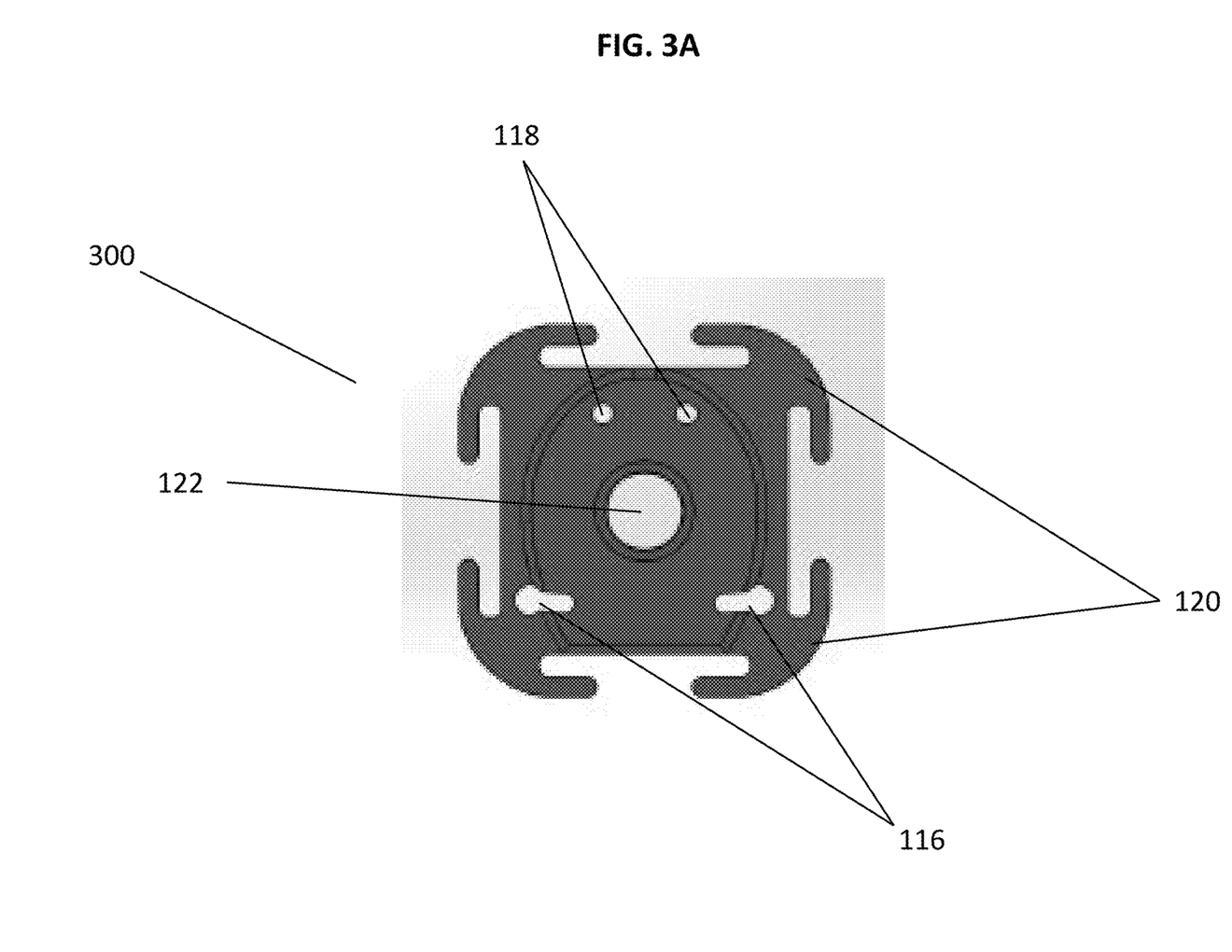
FIG. 3A is a front perspective view of a base plate of the clipping system.

FIG. 3A is a front perspective view of a base plate 300 of the clipping system. The base plate 300 is disengagable and rotatable. The base plate 300 is comprised of the lower openings 116, the upper connection points 118 formed as openings, four webbing guides 120, and an opening 122. The opening 122 is preferably circular. The base plate 300 is designed to fit behind the left and right side members 102, 102' when assembled. That is, the left and right side members 102, 102' are rotatably mounted to the base plate 300. Once assembled, the upper connection points 118 of the base plate 300 line up with the upper connection points 114 of the connection mechanism and the upper clip connection points 104, 104' of the left and right side members 102, 102'. The webbing guides 120 extend from each corner of the base plate 300. The webbing guides 120 are used to attach the base plate 300 to the webbing (e.g., a strap) of any bag or accessory. The webbing guides 120 are configured to fit a variety of different webbing sizes.

Figure 3B:
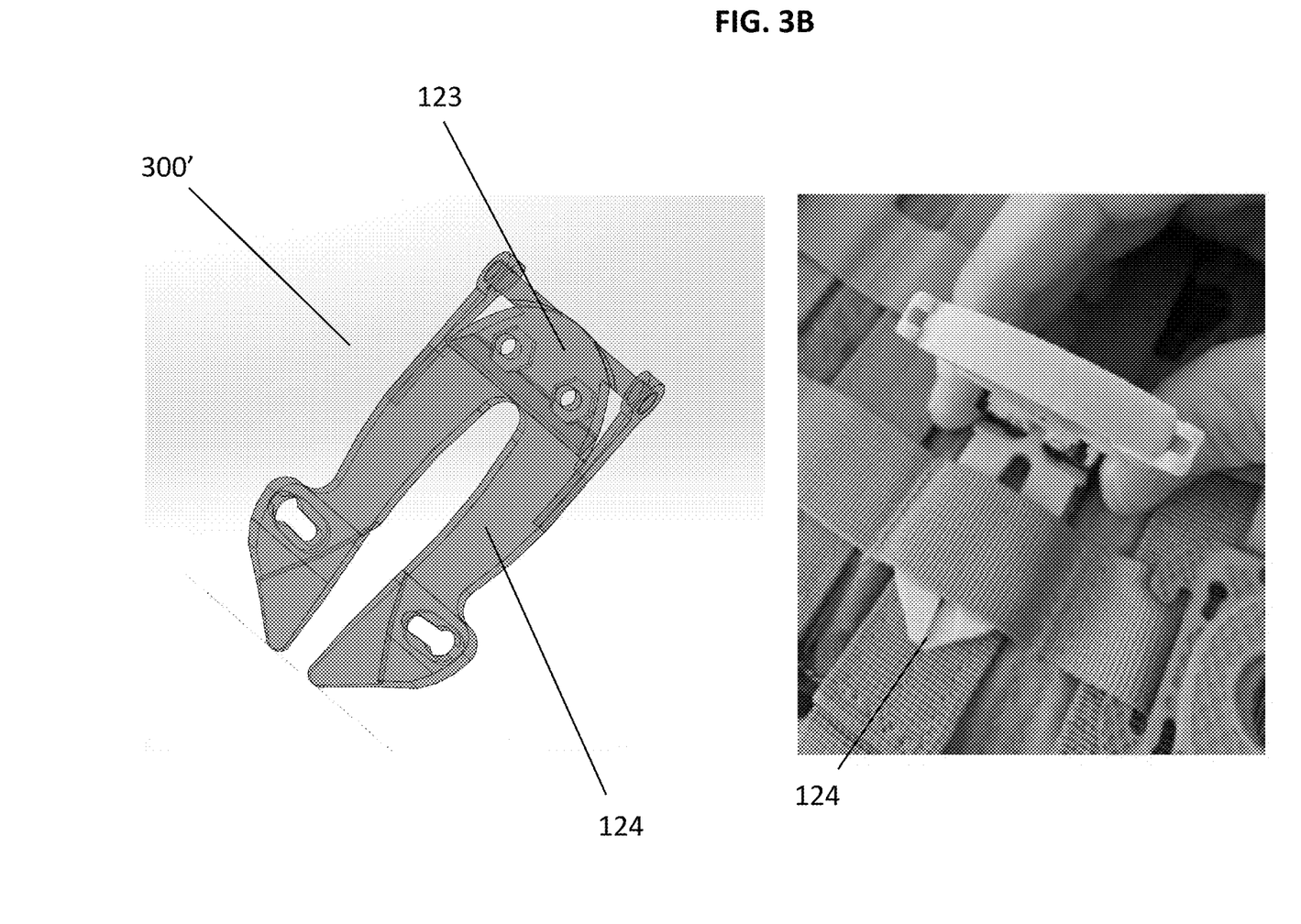
FIG. 3B is a front perspective view of an alternate embodiment of the base plate.

The base plate 300 can be modified in a number of ways. As shown in FIG. 3B, one of the exemplary variations to the base plate 300' is a version that can be squeezed to fit underneath a 1-inch piece of Molle webbing and then reconnected to left and right side members 102, 102' to create a secure connection to the one-inch piece of Molle webbing. The base plate 300' variation is made up of an upper section 123 and lower section 124. The upper section 123 of the base plate 300 connects to the clip and the lower section 124 has two elongated arms that are separated by a gap with an open distal end and a proximal end that is pivotally attached to the upper section 123, such as by a hinge or the like. The arms act like a spring that is biased outward and can be pressed inwardly toward each other to be reduced in width to slidably fit under the webbing. The arms can then spring outward to open wider once it passes through the webbing, to make a connection to the spring connectors and secure itself to the 1-inch Molle webbing. In certain embodiments, the arms may be thickened to provide additional stability and a more secure connection to the webbing.

Figure 3C:
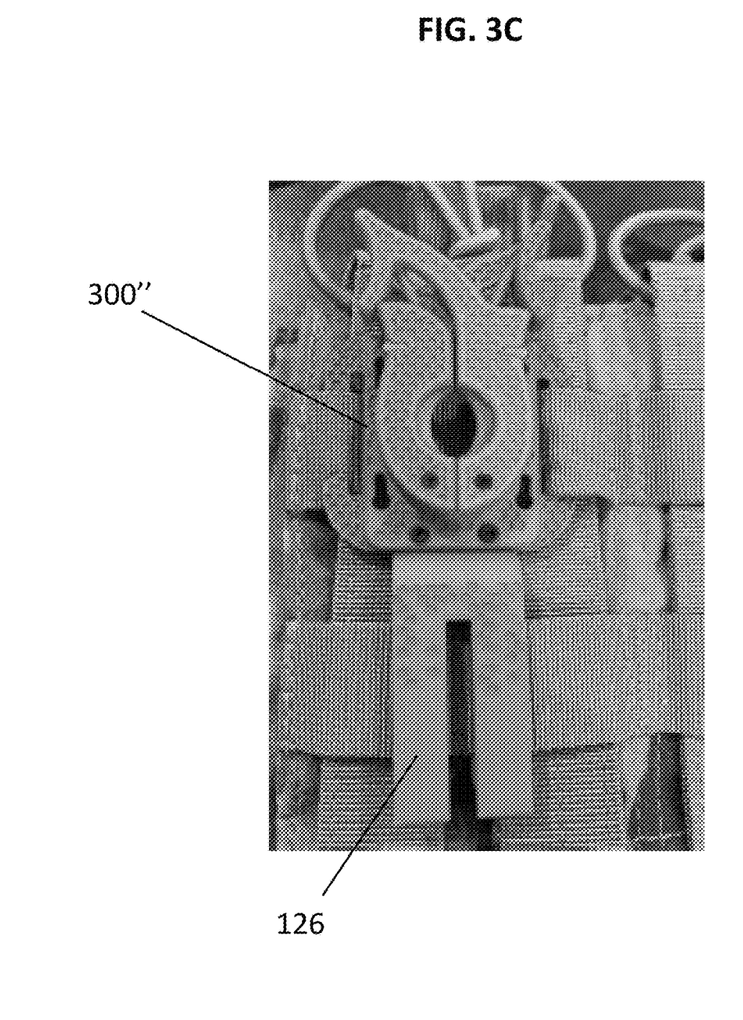
FIG. 3C is a front perspective view of another alternate embodiment of the base plate.

FIG. 3C is a front perspective view of another alternate embodiment of the base plate 300". In this alternate embodiment, the base plate 300" is further comprised of a base slide mechanism 126. The base slide mechanism 126 may be used to further secure the clipping system to the webbing or other surface and acts to stabilize the clipping system during operation.

The base plates 300, 300', 300" can also be swapped out or changed to attach to a myriad of surfaces. In certain embodiments, the base plate 300, 300', 300" may include magnet attachments, and in yet other embodiments, the base plate 300, 300', 300" may itself be a magnet. The base plate 300, 300', 300" may also include additional holes along its perimeter that may be used to permanently affix the base plate 300, 300', 300" and the rest of the clipping system to a surface.

Figure 4:
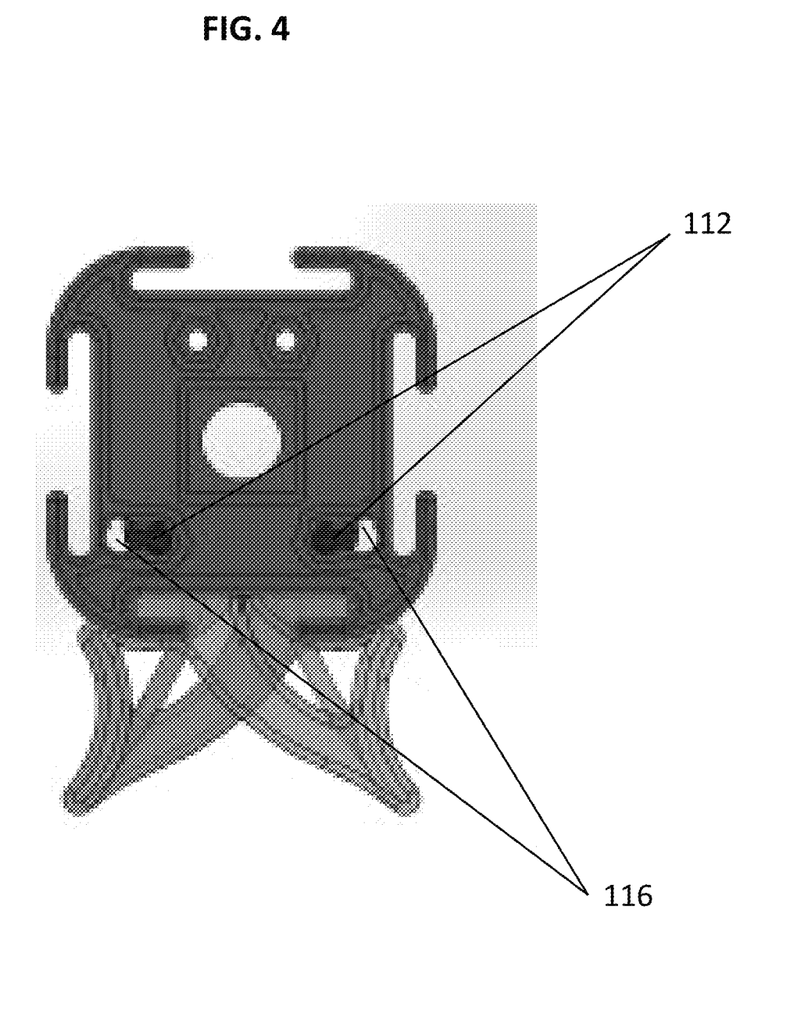
FIG. 4 is a front perspective view of the assembled base plate, the connection mechanism, and the left and right mirrored sides of the clipping system.

Referring now to FIG. 4, upon assembly, the lower openings 116 of the base plate 300 (FIG. 3A) are configured to mate with one side of the spring locking mechanisms 112 of the spring connection mechanism 200 (FIG. 2A). Preferably, the spring locking mechanisms 112 are inserted and lock into the lower openings 116. On the other side, the spring locking mechanisms 112 fit into the spring mechanism cavities 106, 106' of the left and right side members 102, 102'. When assembled, the spring connection mechanism 200 is sandwiched between the base plate 300 and the left and right side members 102, 102'.

When fully assembled, as shown in FIGS. 5A and 5B, the left and right side members 102, 102', the spring connection mechanism 200, and the base plate 300 are aligned so that a peg or other male fitting 400 (e.g., a rod) may be inserted into the clip, such that both sides may be attached to webbing or other materials. The peg or other male fitting 400 may then be attached to another object such as an accessory on its opposite side. As shown in FIGS. 5A and 5B, the spring connection mechanism 200 is sandwiched between the base plate 300 and the left and right side members 102, 102'. In certain embodiments, there may be a cavity in the male fitting or peg 400 so that a magnetic connection can be made to guide and connect the male fitting or peg 400 and the base plate 300 with the clipping system securing the connection to increase the weight and load tolerances. In yet other embodiments, there may be a suction cup or a magnet on the face of the male fitting or peg 400 opposite from its connection to the rest of the clipping system. The suction cup or magnet can then be used to form a secure connection to various surfaces.

Once the clipping system is assembled as shown in FIGS. 5A and 5B, the left and right side members 102, 102' are locked, and the handles 108, 108' may be pushed inwards to increase the circumference of the circular opening 110, such that another element, exemplarily the peg 400 shown with respect to FIGS. 5A and 5B, may be inserted into the circular opening 110, and then the peg 400 is locked in the opening 110 once the handles 108, 108' are released. The peg 400 is held in the circular opening 110 by the left and right side members 102, 102', which act as a quick release mechanism, whereby the user need only push the handles 108, 108' together to connect and disconnect the peg 400. Exemplarily, the opening 110 need not be circular, but can have the shape of a square, octagon, or hexagon. The peg 400 can be connected to an external part or accessory that can be quickly and easily attached or removed.

Various alterations in the design of any of the foregoing components of the clipping system may be made to accommodate a blend of materials such as metals and plastics to increase strength and max force loads.

It is further noted that the description and claims use several geometric or relational terms, such as circular, arcuate, curved, linear, elongated, rounded, and flat. In addition, the description and claims use several directional or positioning terms and the like, such as top, bottom, left, right, up, down, inner, outer, distal, and proximal. Those terms are merely for convenience to facilitate the description based on the embodiments shown in the figures, and are not intended to limit the invention. Thus, it should be recognized that the invention can be described in other ways without those geometric, relational, directional or positioning terms. In addition, the geometric or relational terms may not be exact. For instance, walls or surfaces may not be exactly circular to one another but still be considered to be substantially circular because of, for example, roughness of surfaces, tolerances allowed in manufacturing, etc. And, other suitable geometries and relationships can be provided without departing from the spirit and scope of the invention.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A clipping apparatus comprising:
 a first member comprising a first cavity and a first handle;
 a second member comprising a second cavity and a second handle;
 said first member and said second member mated to a spring connection mechanism and a base plate, wherein the mating of the first member and the second member to the spring connection mechanism and the base plate forms an opening;
 wherein when the first handle and the second handle are pushed inwards, a male fitting is accepted into the opening and locked into the opening when the first handle and the second handle are released; and
 wherein the spring connection mechanism is sandwiched between the base plate and the first and second members.

2. The clipping apparatus of claim 1, wherein the male fitting is a peg.

3. The clipping apparatus of claim 1, wherein the male fitting has a member that is configured to attach to a magnet or a suction cup.

4. The clipping apparatus of claim 1, wherein the base plate is further comprised of a base slide mechanism.

5. The clipping apparatus of claim 4, wherein the base slide mechanism is configured to attach to webbing.

6. The clipping apparatus of claim 1, wherein the base plate is disengageable and rotatable.

7. The clipping apparatus of claim 1, further comprising a clip locking mechanism.

8. The clipping apparatus of claim 1, wherein the base plate is further comprised of a plurality of webbing guides.

9. The clipping apparatus of claim 1, wherein the clipping apparatus is comprised of plastic, metal, or a combination of the two.

\* \* \* \* \*